(12) United States Patent
Chen et al.

(10) Patent No.: US 10,757,680 B2
(45) Date of Patent: Aug. 25, 2020

(54) ENHANCED PAGING FOR LOW COST (LC) MACHINE TYPE COMMUNICATION (MTC) UES

(71) Applicant: MEDIATEK Singapore Pte. Ltd., Singapore (SG)

(72) Inventors: Hua-Min Chen, Beijing (CN); Tao Chen, Beijing (CN)

(73) Assignee: HFI Innovations INC., HsinChu (TW)

( * ) Notice: Subject to any disclaimer, the term of this patent is extended or adjusted under 35 U.S.C. 154(b) by 0 days.

(21) Appl. No.: 15/689,154

(22) Filed: Aug. 29, 2017

(65) Prior Publication Data
US 2017/0359801 A1    Dec. 14, 2017

Related U.S. Application Data

(63) Continuation of application No. PCT/CN2015/076993, filed on Apr. 20, 2015.

(51) Int. Cl.
*H04W 68/00*    (2009.01)
*H04W 68/02*    (2009.01)
(Continued)

(52) U.S. Cl.
CPC .............. *H04W 68/02* (2013.01); *H04W 4/12* (2013.01); *H04W 4/70* (2018.02); *H04W 68/005* (2013.01);
(Continued)

(58) Field of Classification Search
CPC ........ H04W 68/02; H04W 4/12; H04W 52/02
See application file for complete search history.

(56) References Cited

U.S. PATENT DOCUMENTS

2011/0044233 A1*  2/2011  Cho .............. H04B 7/155
                                                 370/315
2014/0098761 A1*  4/2014  Lee .............. H04W 74/006
                                                 370/329
(Continued)

FOREIGN PATENT DOCUMENTS

CN     104349290 A    8/2013
EP      2787671 A1    4/2013
(Continued)

OTHER PUBLICATIONS

International Search Report and Written Opinion of International Search Authority for PCT/CN2015/076993 dated Jan. 21, 2016 (11 pages).

(Continued)

*Primary Examiner* — Pakee Fang
(74) *Attorney, Agent, or Firm* — Imperium Patent Works; Helen Mao (57) ABSTRACT

Methods and apparatus are provided for paging enhancement for LC-MTC devices. In one novel aspect, a new paging message is used. In one embodiment, a new system information (M-SI)-paging is provided either carrying a bitmap or being generated from specific M-P1-RNTI sequences to indicate the modified SI messages. In another embodiment, a new RRC-paging is used through a UE-specific message, a multicast message, or a broadcast message to inform a UE to establish a RRC connection. The new paging message is either a sequence or an encoded data packet transmitted without control information, or scheduled by M-PDCCH. In another novel aspect, the new paging message is transmitted within one or more cells by a broadcast mechanism to achieve a maximal CE level the one or more cells support, or a multi-cast mechanism to support (Continued)

a specified CE level range, or a unicast mechanism to support a CE level.

15 Claims, 7 Drawing Sheets

(51) Int. Cl.
*H04W 4/70* (2018.01)
*H04W 4/12* (2009.01)
*H04W 52/02* (2009.01)

(52) U.S. Cl.
CPC ......... *H04W 52/02* (2013.01); *Y02D 70/1224* (2018.01); *Y02D 70/1262* (2018.01); *Y02D 70/20* (2018.01); *Y02D 70/21* (2018.01)

(56) References Cited

U.S. PATENT DOCUMENTS

| | | | |
|---|---|---|---|
| 2014/0334403 A1* | 11/2014 | Park | H04J 11/005 370/329 |
| 2015/0043445 A1 | 2/2015 | Xiong et al. | 370/329 |
| 2015/0131579 A1* | 5/2015 | Li | H04L 1/08 370/329 |
| 2017/0289957 A1* | 10/2017 | Zhang | H04W 68/02 |
| 2017/0311284 A1* | 10/2017 | Basu Mallick | H04W 68/02 |

FOREIGN PATENT DOCUMENTS

| | | |
|---|---|---|
| WO | WO2015019182 A2 | 8/2013 |
| WO | WO2015026285 A2 | 8/2013 |

OTHER PUBLICATIONS

EPO, search report for the EP application 15889464.2 dated May 25, 2018 (9 pages).
R1-151232 3GPP TSG RAN WG1 Meeting #80bis, Alcatel-Lucent et al., "Considerations on Common Control Messages for LC-MTC", Belgrade, Serbia, Apr. 20-24, 2015 (4 pages).
R1-150130 3GPP TSG RAN WG1 Meeting #80, Alcatel-Lucent et al., "Common control messages for LC-MTC", Athens, Greece, Feb. 9-13, 2015 (4 pages).
R2-141304 3GPP TSG-RAN WG2 #85bis, Ericsson, "Paging mechanism for low cost UEs", Valencia, Spain, Mar. 31-Apr. 4, 2014 (4 pages).
EPO, search report for the EP application 15889464.2 dated Feb. 12, 2019 (6 pages).
3GPP TSG-RAN WG2 Meeting #89bis R2-151165, Panasonic, "Change of MTC system information", Bratislava, Slovakia, Apr. 20-24, 2015 (2 pages).

* cited by examiner

ENHANCED PAGING FOR LOW COST (LC) MACHINE TYPE COMMUNICATION (MTC) UES

CROSS REFERENCE TO RELATED APPLICATIONS

This application is filed under 35 U.S.C. § 111(a) and is based on and hereby claims priority under 35 U.S.C. § 120 and § 365(c) from International Application No. PCT/CN2015/076993, with an international filing date of Apr. 20, 2015. This application is a continuation of International Application No. PCT/CN2015/076993, which is pending as of the filing date of this application, and the United States is a designated state in International Application No. PCT/CN2015/076993. The disclosure of each of the foregoing documents is incorporated herein by reference.

TECHNICAL FIELD

The disclosed embodiments relate generally to wireless communication, and, more particularly, to paging enhancement for low cost (LC) machine type communication (MTC) UEs.

BACKGROUND

Machine-Type Communication (MTC) is an important revenue stream for operators and has a huge potential from the operator perspective. Lowering the cost of MTC user equipment (UEs)/devices is an important enabler for the implementation of the concept of "internet of things" (IOT). Many MTC devices are targeting low-end (low average revenue per user, low data rate) applications that can be handled adequately by GSM/GPRS. In order to ensure that there is a clear business benefit to MTC UE vendors and operators for migrating low-end MTC devices from GSM/GPRS to LTE networks, there are many discussions within 3GPP scope about a new type of terminal, i.e. a low cost (LC) MTC UE, from Rel-11 to Rel-13. The cost of the LC-MTC UEs is tailored for the low-end of the MTC market to be competitive with that of GSM/GPRS terminals. The LC-MTC UEs are characterized by: 1) One Rx antenna; 2) Downlink and uplink maximum TBS size of 1000 bits; 3) Bandwidth reduction—resources for each channel transmission are limited to contiguous 6 PRBs (1.4 MHz) for cost reduction, and 4) Coverage enhancement (CE)—some applications of LC-MTC UEs will require 15-20 dB coverage extension and repeated transmission is a common technique to compensate penetration losses. Due to the limitations and repeatedly transmission requirement, LC-MTC UEs with or without coverage enhancement, and the UEs in CE mode cause larger overhead for signaling processes, such as the paging process.

In a wireless network like LTE/LTE-A, one main purpose of a paging message is to page UEs for RRC connections. The paging message can be also used to inform UEs of system-information (SI) update, wherein SI comprises master information block (MIB), system information block-1 (SIB-1) and other SIB-x (SIB-2~SIB-16). In the traditional paging process, the paging message does not indicate which SI is updated, except for ETWS, CMAS, and EAB. The UE has to detect and decode all SI messages during the SI modification period. For UEs in the LC MTC mode where the data blocks are repeatedly transmitted, it adds a large overhead and degrades UE battery life. Further, since a paging message is broadcasted, the repeated transmission adds system overheads to a large number of cells as well.

Enhancement of the paging messages and procedures are needed for LC MTC mode UEs.

SUMMARY

Methods and apparatus are provided for paging enhancement for LC-MTC devices. In one novel aspect, a new paging message, for example a modified paging for LC MTC UEs (M-Paging) which is a new SI-paging for LC MTC UEs (hereinafter called M-SI-paging) or a new RRC-paging for LC MTC UEs (hereinafter M-RRC-paging) or both of M-SI-paging and M-RRC-paging, is used for LC MTC UEs. In one embodiment, a M-SI-paging carrying a bitmap is provided. The size of the bitmap is a fixed length in one embodiment. The size of the bitmap is of variable length in another embodiment. In yet another embodiment, the M-SI-paging is generated from specific M-P1-RNTI sequence(s) to indicate a subset of modified SI messages for LC MTC UEs (M-SI). In one embodiment, the M-SI-paging is a sequence generated from a specific M-P1-RNTI. In another embodiment, the specific M-SI-paging is a message carried by PDSCH, which is scrambled with a specific M-P1-RNTI.

In another embodiment, a M-RRC-paging is used through a UE-specific message, a multicast message, or a broadcast message to inform a UE without RRC connection to establish a RRC connection. The new M-RRC-paging message is either a sequence or an encoded data packet transmitted without control information, or scheduled by common M-PDCCH/UE-specific M-PDCCH. Here, the common M-PDCCH is a common region within M-PDCCH to schedule common or UE-specific data, while the UE-specific M-PDCCH is a UE-specific region within M-PDCCH (M-PDCCH) to schedule UE-specific data packets.

In another novel aspect, the M-Paging is transmitted based on the UE CE status. In one embodiment, the M-paging message is transmitted within one or more cells by a broadcast mechanism to achieve a maximal CE level the one or more cells support. In another embodiment, the M-paging message is transmitted to multiple UEs, using a multi-cast mechanism to support a specified CE level, wherein grouping of multiple UEs with CE requirements within the specified CE level is performed. In yet another embodiment, the M-paging message is transmitted to a specific UE, using a unicast mechanism to support a specific CE requirement of the targeted UE.

In one novel aspect, the UE sends UE CE status report to a network entity, like MME/NAS. In one embodiment, the UE sends the CE status report upon detecting one or more triggering event. The CE status comprises a CE level of UE to one cell or to multiple cells. The reported CE status may include specified CE level, the repetition number, some measurements for CE status determination, the cell ID, the cell group ID, and the UE ID. The CE level may be determined by the base station or by the UE. The network entity will record a cell Id or cell group ID about a CE status or multiple CE status of one UE, the UE ID Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
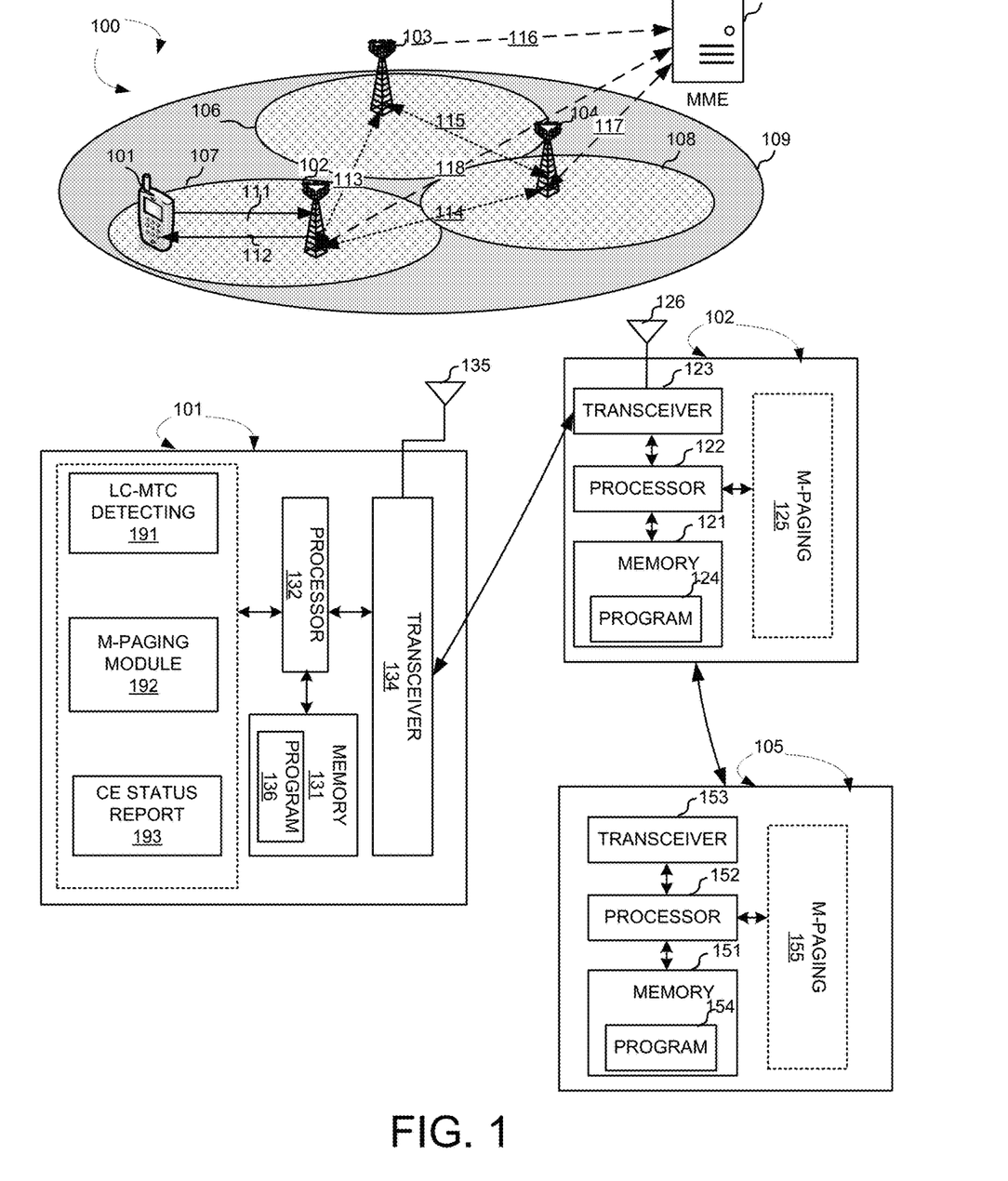
FIG. 1 illustrates an exemplary mobile communication network with low cost MTC UEs in accordance with embodiments of the current invention.

FIG. 1 illustrates an exemplary mobile communication network 100 with low cost MTC UEs in accordance with embodiments of the current invention. Wireless communication system 100 includes one or more fixed base infrastructure units, such as base stations 102 103, and 104, forming a network distributed over a geographical region. The base unit may also be referred to as an access point, an access terminal, a base station, a Node-B, an eNode-B, or by other terminology used in the art. Each of the base stations 102, 103 and 104 serves a geographic area such as cell 107, 106, and 108, respectively. Backhaul connections 113, 114 and 115 connect the non-co-located base stations, such as 102, 103 and 104. These backhaul connections can be either ideal or non-ideal A mobile station 101 in wireless network 100 is served by base station 102 via uplink 111 and downlink 112.

In one embodiment, mobile communication network 100 is an OFDM/OFDMA system comprising a base stations eNBs 102, 103 and 104, and a plurality of mobile stations, such as mobile station 101. Mobile station 101 is a real LC MTC UE actually in one embodiment. In another mobile station 101 is a normal or regular UE which is served/regarded as LC MTC UEs, i.e., a normal UE operating in LC-MTC mode. Then, an LC-MTC UE or UE in LC-MTC mode can be originated from a regular UE, a LC MTC UE, an MTC UE or any other type of UE. When there is a downlink packet to be sent from eNodeB to mobile station, each mobile station gets a downlink assignment, e.g., a set of radio resources in a physical downlink shared channel (PDSCH). When a UE needs to send a packet to eNodeB in the uplink, the mobile station gets a grant from the eNodeB that assigns a physical downlink uplink shared channel (PUSCH) consisting of a set of uplink radio resources. The mobile station gets the downlink or uplink scheduling information from a physical downlink control channel (PDCCH) or an enhanced physical downlink control channel (EPDCCH) or a physical downlink control channel for MTC UEs (M-PDCCH) dedicated for LC MTC UEs. The downlink or uplink scheduling information and the other control information, carried by PDCCH/EPDCCH/M-PDCCH, is referred to as downlink control information (DCI).

Base stations such as 102, 103 and 104 are connected to a network entity, such as a mobility management entity (MME) 105, via links of 116, 117 and 118. In wireless network 100, paging procedures (e.g., for RRC connection setup) are initiated by a network entity such as MME 105, and a paging message is transmitted to cells within a same tracking area. One or more cells form a tracking area for a UE. For example, a track area 109 is formed for UE 101 including cells 106, 107 and 108, served by base stations 103, 102 and 104, respectively.

FIG. 1 further shows simplified block diagrams of mobile 101, base station 102 and MME 105 in accordance with the current invention. MME 105 has a transceiver 153, receives signals from links with base stations, and sends them to processor 152. Transceiver 153 receives signals from processor 152, and sends out to links to the base stations. Processor 152 processes the received signals and invokes different functional circuits and modules to perform features in MME 105. Memory 151 stores program instructions and data 154 to control the operations of MME 105. Except for the normal paging management module used for normal UEs, MME 105 also includes a set of control modules, such as modified paging CM-paging) for LC MTC UEs module 155 that carry out functional tasks to communicate with mobile stations.

Base station 102 has an antenna 126, which transmits and receives radio signals. A RF transceiver 123, coupled with the antenna, receives RF signals from antenna 126, converts them to baseband signals and sends them to processor 122. RF transceiver 123 also converts received baseband signals from processor 122, converts them to RF signals, and sends out to antenna 126. Processor 122 processes the received baseband signals and invokes different functional circuits and modules to perform features in base station 102. Memory 121 stores program instructions and data 124 to control the operations of base station 102. Base station 102 also includes a set of control circuits and modules, expect for the normal paging management module, such as M-paging circuit 125 that carry out functional tasks to communicate with mobile stations.

Mobile station 101 has an antenna 135 comprising one or more antennas, which transmits and receives radio signals.

A RF transceiver 134, coupled with the antenna, receives RF signals from antenna 135, converts them to baseband signals and sends them to processor 132. RF transceiver 134 also converts received baseband signals from processor 132, converts them to RF signals, and sends out to antenna 135. Processor 132 processes the received baseband signals and invokes different functional circuits and modules to perform features in mobile station 101. Memory 131 stores program instructions and data 136 to control the operations of mobile station 101.

Mobile station 101 also includes a set of control circuits and modules that carry out functional tasks. In one example, each circuit or module may comprise a processor (e.g., processor 132) with associated program instructions. A LC-MTC detector 191 monitors and detects whether UE 101 is in the LC MTC mode. An M-paging circuit 192 receives a M-paging message and decodes the M-paging message upon detecting the LC MTC mode. A CE status circuit 193 monitors and detects CE level for UE 101 and sends CE status report to the network upon detecting one or more triggering events, such as the change of CE level of UE 101.

Legacy paging messages causes large overhead to a network supporting LC MTC UEs in CE mode by a repeated transmission mechanism, or in normal coverage wherein repetition is also applied to guarantee coverage, and shortens the battery life of UE under the repeated transmission mechanism. Further, with reduced bandwidth and limited TBS, some enhancement for paging is needed. Therefore, a modified paging for LC MTC UEs (M-Paging) is desired. The first issue to use the M-paging mechanism is to determine whether the M-paging message or process applies to the UE. The UE needs to determine whether the UE is in the LC MTC mode. A UE can be categorized as a normal UE or a LC-MTC UE. A real LC-MTC UE operates in the LC MTC mode, which has limited TBS size, and reduced bandwidth, one Rx antenna, etc. Different from the real LC-MTC UE, a normal UE without coverage extension operates in the normal mod without any limitation to bandwidth, TBS, etc. A normal UE may operate either in a normal mode or in a CE mode. In one embodiment of the current invention, the normal UE operates in the CE mode is considered to be in the LC MTC mode, which may require repeatedly transmission just as a LC-MTC UE. It means that normal UE in the CE mode can be a LC-MTC UE.

Figure 2:
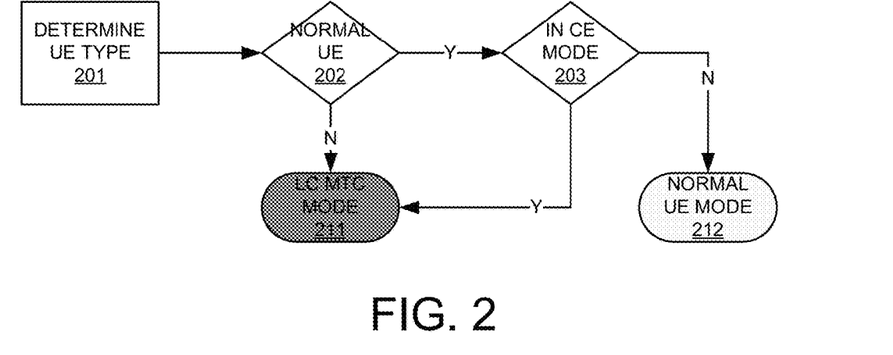
FIG. 2 shows an exemplary diagram for a UE to determine whether it is in the LC MTC mode in accordance with embodiments of the current invention.

FIG. 2 shows an exemplary diagram for a UE to determine whether it is in the LC MTC mode in accordance with embodiments of the current invention. At step 201, the UE determines a UE type, which is a LC MTC UE type or the other UE, for example a normal UE comparable the LC MTC UE. At step 202, the UE determines whether the UE is a normal UE. If step 202 determines that the UE is not a normal UE, the UE moves to step 211 and determines is in LC MTC mode. A LC-MTC UE needs to repeatedly send/receive data blocks even in the normal coverage. If step 202 determines that the UE is a normal UE, the UE moves to step 203 to check whether the UE is in a coverage extension mode. If step 203 determines that the normal UE is not in a coverage extension mode, the UE moves to step 212, which determines that the UE is a normal mode. If step 203 determines that the normal UE is in a coverage extension mode, then the UE moves to step 211 to determine that the UE is in the LC MTC mode.

Upon determining whether the UE is in the LC MTC mode, M-paging message can be used for the LC MTC mode UEs. There are multiple types of M-paging messages for different functionalities. One is the paging message to indicate an update of modified system information message for LC MTC UEs (M-SI), i.e., named as M-SI-paging. Here, M-SI messages comprise master information block for MTC UEs (M-MIB), system information block x for MTC UEs (M-SIBx). Further, each M-SI-n is formed by one or more M-SIBx. Note that M-SI-0 comprises M-MIB. M-MIB can be a new message dedicated for LC MTC UEs, or legacy MIB wherein some messages for LC MTC UEs are transmitted. Similarly, M-SIBx is a new message dedicated for LC MTC UEs, or legacy SIB-x wherein some indications for LC MTC UEs are transmitted and these indications cannot be realized by normal UEs in normal mode. A second M-Paging message is the M-RRC-paging message to initiate RRC connection setup for UEs without RRC connection in LC MTC mode.

In one novel aspect, the legacy paging message is used for normal UE in the normal mode, and M-paging messages comprising M-SI-paging and M-RRC-paging are used for UE in the LC MTC mode. In one embodiment, a single M-SI-paging carrying a bitmap is transmitted within a cell to indicate UEs in LC MTC mode which M-SI messages are updated, wherein the size of the bitmap is fixed or variable. That means only one M-SI-paging message is transmitted within a cell for notification of M-SI messages update. Such single M-SI-paging message is transmitted as an encoded data packet that is scrambled with a M-P1-RNTI different from legacy P-RNTI. In another embodiment, one or more specific M-SI-paging messages with one or more specific M-P1-RNTI sequences are transmitted within a cell to indicate UEs in LC MTC mode a specific subset of M-SI messages modification. That means one or more specific M-SI-paging messages within one cell are transmitted in case there are some M-SI messages update. In yet another embodiment, M-SI-paging message is M-SIB1 wherein notification of M-SI messages update is given by a bitmap. No matter what the CE level of the UE is, the same M-SI-paging is shared by UEs. In case there are UEs with coverage enhancement, the M-SI-paging message is repeated by a maximal number the cell can support.

Figure 3:
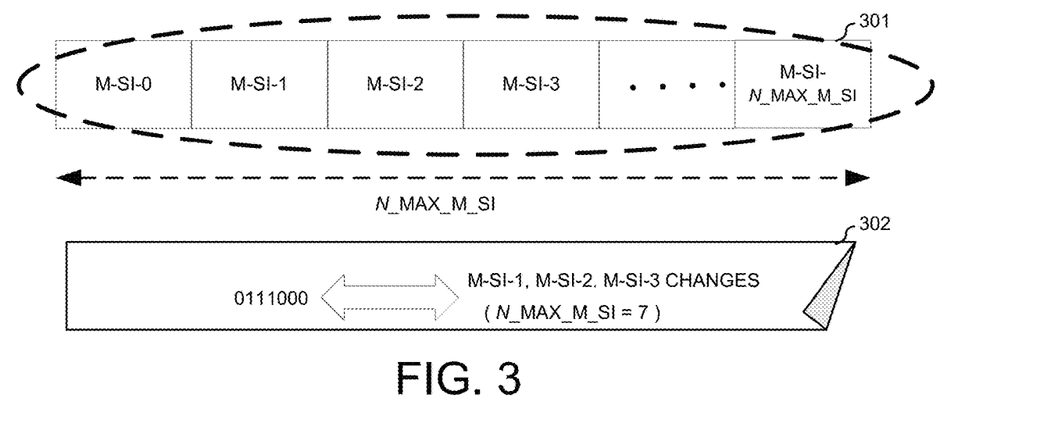
FIG. 3 is an exemplary diagram for a modified SI-paging message carrying a fixed length bitmap to indicate which M-SI information message(s) is updated.
Figure 4:
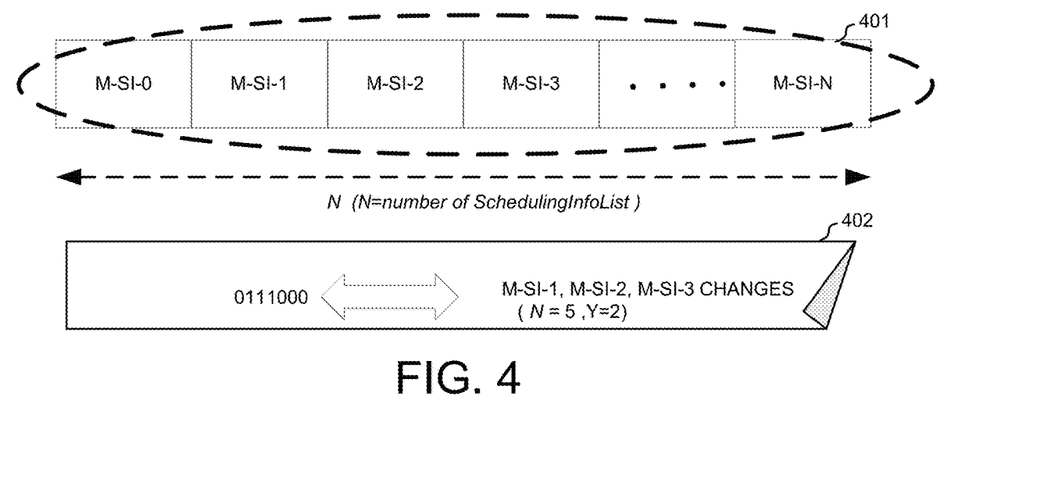
FIG. 4 is an exemplary diagram for a modified SI-paging message carrying a variable length bitmap to indicate which M-SI information message(s) is updated.

FIG. 3 and FIG. 4 illustrates two different M-SI-paging messages for a single M-SI-paging message carrying a bitmap to indicate modifications of M-SI messages. FIG. 3 is an exemplary diagram for a modified M-SI-paging message carrying a fixed length bitmap to indicate which M-SI information message(s) is updated. Bitmap 301 is a fixed size bitmap carrying M-SI indication messages. The size of bitmap 301 is fixed as a maximal number of M-SI messages a system can support for UEs in LC MTC mode. Each bit indicates a corresponding M-SI message. In one embodiment, if the bit is set to be "1", it indicates that the corresponding M-SI message is updated. The UE in the LC MTC mode would decode the corresponding M-SI message. If the corresponding bit is set to be "0", it indicates the corresponding M-SI message is not updated during the M-SI modification period. Thereby, the UE in the LC MTC mode will not decode the all M-SI messages to reduce power consumption. Chart 302 shows an example for the fixed length bitmap for M-SI-paging. Assuming the maximum number of M-SI messages N_Max_M-SI is seven. A bitmap with the fix length of N_Max_M-SI is used to represent each M-SI message with one bit. In the example showed in 302, bit sequence "0111000" means M-SI messages M-SI-1, M-SI-2, and M-SI-3 are changed. By decoding the fixed length bitmap, the UE in the LC MTC mode knows exactly which M-SI messages are updated.

FIG. 4 is an exemplary diagram for a M-SI-paging message carrying a variable length bitmap to indicate which M-SI message(s) is updated. The size of bitmap 401 is of variable length. Bitmap 401 has N bits. The size of the bitmap depends on the number of scheduling information list and configurations within M-SIB1. Each bit indicates a corresponding M-SI message. In one embodiment, if the bit is set to be "1", it indicates that the corresponding M-SI message is updated. The UE in the LC MTC mode would decode the corresponding updated M-SI messages. If the corresponding bit is set to be "0", it indicates the corresponding M-SI message is not updated. Thereby, the UE in the LC MTC mode will not decode the all M-SI messages to improve power consumption efficiency. Note that a LC MTC UE should decode M-SIB1 first to decode M-SI-paging since length of M-SI-paging message depends on M-SIB1. Then, when the UE determines there is M-SI-paging within a set of radio resources, the UE needs to buffer the received M-SI-paging message and decode it after obtaining information within M-SIB1. Chart 402 shows an example for the fixed length bitmap for M-SI-paging. Assuming the number of scheduling information list is N. The size of the bitmap is Y+N, wherein Y equals zero, one or two. In one embodiment, Y equals zero and the size of the variable length equals to the number of scheduling information list N, when M-SIB1 transmission information (resource allocation, MCS, etc) is indicated by M-MIB. The size of the bitmap can be zero, which indicates M-MIB or M-SIB1 changes. This is because LC MTC UEs always need to decode M-SIB1 before decoding M-SI-paging, and it is not necessary to indicate M-SIB1 or M-MIB update, when M-SIB1 decoding depends on M-MIB.

In another embodiment, there is no relationship between M-SIB1 and M-MIB, and Y equals one. The size of the variable length equals to the number of scheduling information list 1+N, wherein the first bit within the bitmap indicates an update of M-MIB. It is not necessary to indicate M-SIB1 modification since LC MTC UEs always need to decode M-SIB1 before decoding M-SI-paging and can determine whether M-SIB1 updates. In yet another embodiment, there is no relationship between M-SIB1 and M-MIB, and Y equals two. The size of the variable length equals to the number of scheduling information list 2+N, wherein the first two bits of the bitmap indicate an update of M-MIB and M-SIB1 respectively. Then, the UE in the LC MTC mode further confirms whether there is update to M-SIB1. In the example showed in 402, bit sequence "0111000" means M-SI messages M-SI-1, M-SI-2, and M-SI-3 are changed, wherein N=5 and Y=2.

Figure 5:
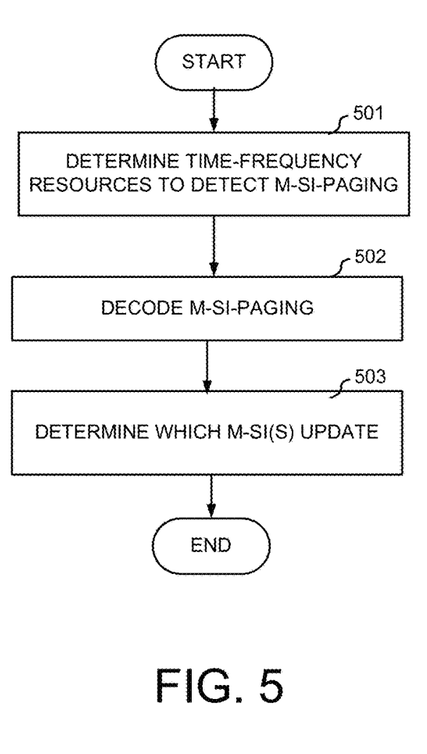
FIG. 5 illustrates an exemplary UE procedure to determine which M-SI messages are updated with a fixed length bitmap in accordance with embodiments of the current invention.
Figure 6:
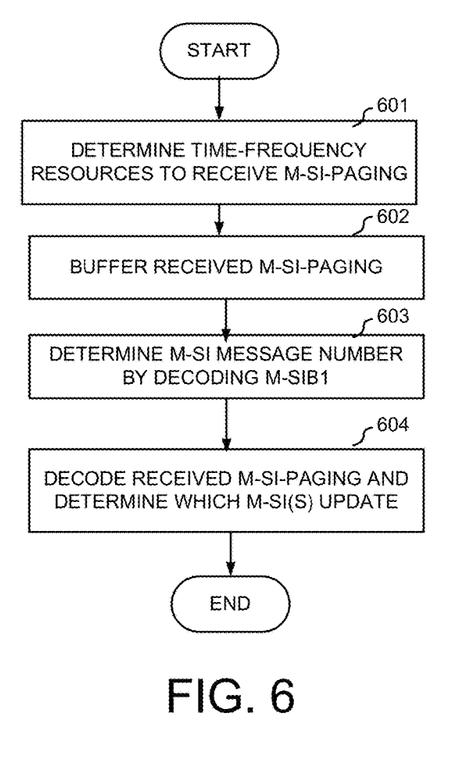
FIG. 6 illustrates an exemplary UE procedure to determine which M-SI messages are updated with variable length bitmap in accordance with embodiments of the current invention.

The M-SI-paging message with fixed length bitmap added a maximal resource overhead while causes smaller detection delay. The M-SI-paging message with variable length bitmap, however, added smaller resource overhead by average with adaptive scheduling while causes larger detection delays because it requires two-step detection. FIGS. 5 and 6 illustrate the two procedures respectively.

FIG. 5 illustrates an exemplary UE procedure to determine which M-SI messages are updated with fixed length bitmap in accordance with embodiments of the current invention. At step 501, the UE determines the time-frequency resources, for example the common M-PDCCH to detect the M-SI-paging. At step 502, the UE decodes the M-SI-paging. At step 503, the UE determines which M-SI messages are updated based on the decoded fixed length bitmap in the M-SI-paging.

FIG. 6 illustrates an exemplary UE procedure to determine which M-SI messages are updated with variable length bitmap in accordance with embodiments of the current invention. At step 601, the UE determines the time-frequency resources, for example the common M-PDCCH to detect the M-SI-paging. At step 602, the UE buffers the received M-SI-paging message. At step 603, the UE determines the number of M-SI messages that may have been updated by decoding the M-SIB1. At step 605, the UE decodes the received M-SI-paging message and determines which M-SI messages have been updated.

In another embodiment for the specific M-SI-paging message, a specific M-SI-paging message, which is a function of a specific M-P1-RNTI, indicates a notification of an update of a specific set of M-SI message(s). Different M-P1-RNTI sequences are designed or allocated to represent to different sets of M-SI messages. In one option, the relationship between M-P1-RNTI or M-SI-paging message and M-SI-n message is one-to-one mapping, for example as showed in table 1. In one embodiment, the one-to-one mapping relationship is predefined. The one-to-one predefined mapping is a function of M-SI-n transmission periodicity in one embodiment, for example as showed on table 3. Then, the number of specific M-P1-RNTIs depends on the number of all possible transmission periodicities for M-SI messages. In another embodiment, the one-to-one predefined mapping is a function of index of M-SI-n message. Then, the number of specific M-P1-RNTI depends on N_MAX_M-SI the maximum number of M-SI messages within a system. In another embodiment for one-to-one mapping, the one-to-one mapping relationship between M-P1-RNTI and M-SI message is (re)configurable. The configuration can be indicated by M-MIB or M-SIB1. Under a one-to-one mapping, a specific R-P1-RNTI can be designed or allocated to a specific M-SI message, and each specific M-SI-paging indicates an update of a specific M-SI message.

In another option, the relationship between R-P1-RNTI or M-SI-paging message and M-SI-n message is one-to-multiple mapping, for example showed in table 2. In one embodiment, the one-to-multiple mapping relationship is predefined. The predefined one-to-multiple mapping relationship is a function of M-SI message transmission periodicities, please refer to table 4. For example, transmission periodicities are grouped into multiple levels, and a set of several M-SI messages correspond to one M-P1-RNTI, if transmission periodicities of these M-SI messages belong to a same periodicity level. In a second embodiment, the predefined one-to-multiple mapping relationship is a function of M-SI index range. For example, indices for M-SI messages are grouped, and the index of a M-SI message within the group correspond to the same specific M-P1-RNTI. In another embodiment for one-to-multiple mapping, the mapping relationship is (re)configurable. The (re)configuration is indicated in M-MIB or M-SIB1. Under the one-to-multiple mapping, a specific M-SI-message corresponds to multiple specific M-SI messages. Within one modification period, part or all of these multiple specific M-SI-n messages update.

TABLE 1 one-to-one mapping relationships betwee M-SI-paging and M-P1-RNTI based in index

| Index of M-SI-n | M-P1-RNTI value | Index of M-SI-paging |
|---|---|---|
| 1 | M-P1-RNTI1 | M-SI-paging1 |
| 2 | M-P1-RNTI2 | M-SI-paging2 |
| . . . | . . . | . . . |
| N_MAX_M-SI | M-P1-RNTIN | M-SI-paging N_MAX_M-SI |

TABLE 2 one-to-multiple mapping
relationships between M-SI-paging
and M-P1-RNTI based in index

| Index of M-SI-n | Index of M-P1-RNTI |
|---|---|
| 1 | M-P1-RNTI1 |
| 2 | |
| 3 | M-P1-RNTI2 |
| 4 | |
| 5 | |
| ... | ... |

TABLE 3 one-to-one mapping relationships between
M-SI-paging and M-P1-RNTI based on
transmission periodicities of M-SI message

| Index | M-SI transmission periodicity (rf) | M-P1-RNTI value |
|---|---|---|
| 1 | 160 | M-P1-RNTI1 |
| 2 | 240 | M-P1-RNTI2 |
| 3 | 320 | M-P1-RNTI3 |
| ... | ... | ... |

TABLE 4 one-to-multiple mapping relationships
between M-SI-paging and
M-P1-RNTI based on transmission
periodicities of M-SI message

| Index | M-SI transmission periodicity (rf) | M-P1-RNTI value |
|---|---|---|
| 1 | 160, 240, 320 | M-P1-RNTI1 |
| 2 | 480, 800 | M-P1-RNTI2 |
| ... | ... | ... |

Figure 7:
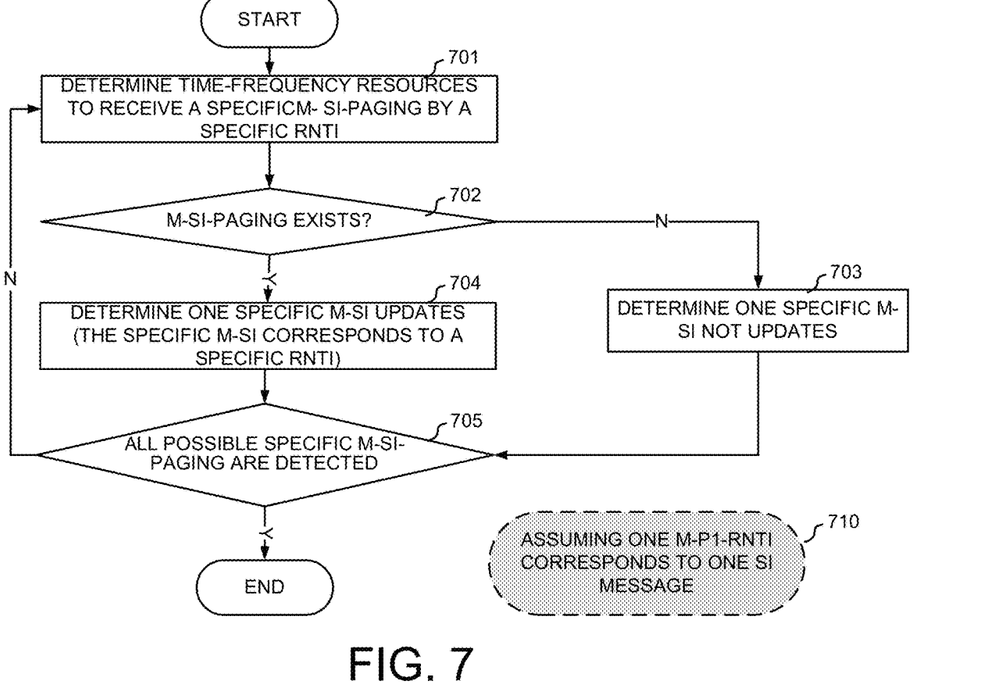
FIG. 7 illustrates an exemplary flow chart for the UE to decode the modified M-SI-paging message where each M-P1-RTNI sequence maps to one M-SI message update notification.
Figure 8:
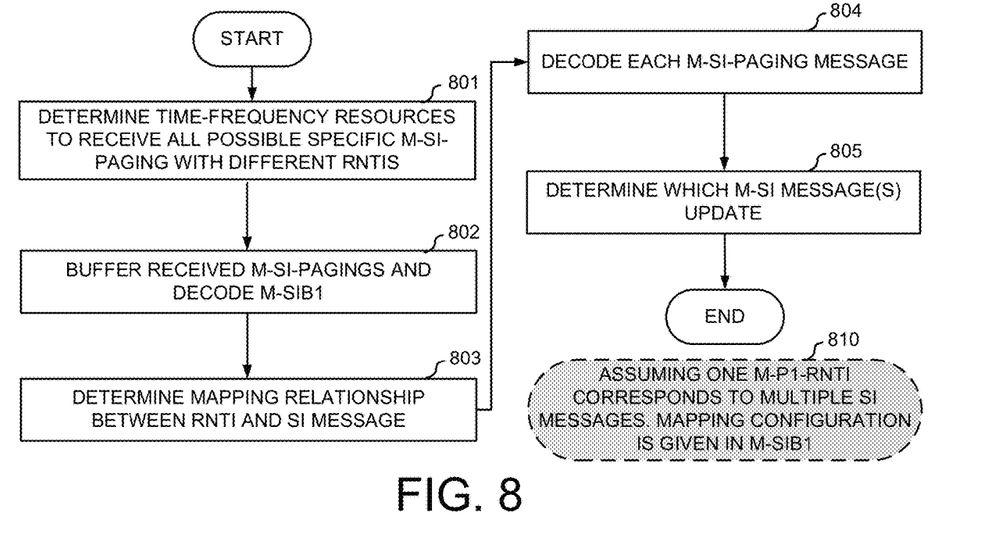
FIG. 8 illustrates an exemplary flow chart for the UE to decode the M-SI-paging message where one M-P1-RTNI sequence maps to a subset of M-SI messages.

Different M-SI-paging formats can be adopted for the specific M-SI message. In a first embodiment, the specific M-SI-paging message is a sequence generated from a specific M-P1-RNTI sequence. The existence of the M-SI-paging by the specific M-P1-RNTI sequence means an update of one M-SI message corresponding to the specific M-P1-RNTI, by a one-to-one mapping, or an update of one or more M-SI messages corresponding to the specific M-P1-RNTI by a one-to-multiple mapping. In one embodiment for the specific M-SI-paging sequence under a one-to-multiple mapping, the UE in the LC MTC mode has to detect the corresponding multiple M-SI messages to determine which M-SI message(s) within the set of multiple M-SI messages update. In a second embodiment, the specific M-SI-paging message is an encoded message carried by PDSCH, which is scrambled with a specific M-P1-RNTI. Information within the specific M-SI-paging informs the UE an update of the corresponding M-SI messages. The information can be a bitmap within a number of corresponding M-SI messages. The one-to-multiple mapping between the set of specific M-SI messages and each corresponding M-P1-RNTI sequence is preferred for a second embodiment. FIG. 7 and FIG. 8 illustrates UE procedures to determine which M-SI(s) has been updated by specific M-SI-paging using M-P1-RTNI sequences.

FIG. 7 illustrates an exemplary flow chart for the UE to determine which M-SI message(s) update by detecting the specific M-SI-paging message where each M-P1-RTNI sequence maps to one M-SI message update notification. At step 701, the UE determines time-frequency resources to receive a specific M-SI-paging generated from a specific RNTI. At step 702, the UE checks whether the M-SI-paging exists. If step 702 determines that the M-SI-paging does not exist, the UE determines that the one specific M-SI associated with the specific M-P1-RNTI is not updated. The UE subsequently checks if all possible specific M-SI-paging messages are checked at step 705. If step 705 determines that all possible specific M-SI-paging messages are checked, the UE moves to terminate the process. If step 705 determines no, the UE moves back step 701 to go through the iteration again with a new specific RNTI. If step 702 determines there exists an M-SI-paging, the UE moves to step 704 to determine the one specific M-SI updates, which corresponds to the specific RNTI in step 701. Subsequently, the UE moves to step 705 to check if all possible specific M-SI-paging are checked. If step 705 determines that all possible specific SI-paging messages are checked, the UE moves to terminate the process. If step 705 determines no, the UE moves back step 701 to go through the iteration again with a new specific RNTI.

FIG. 8 illustrates an exemplary flow chart for the UE to determine which M-SI message(s) update by decoding the M-SI-paging message where one M-P1-RTNI sequence maps to a subset of M-SI messages and the mapping relationship is given in M-SIB1. At step 801, the UE determines time-frequency resources to receive all possible specific M-SI-paging with different RNTIs. Each RNTI sequences maps to a subset of M-SI messages. At step 802, the UE buffers the received M-SI-paging message and decodes M-SIB1. At step 803, the UE determines the mapping relationship between the RNTI and the subset of the M-SI messages. The mapping can be predefined without decoding M-SIB1. The one to multiple M-SI message mapping can also be configured and/or reconfigured by the network. At step 804, the UE decodes each M-SI-paging message carrying a bitmap. At step 805, the UE determines which M-SI messages has been updated.

In another novel aspect, M-RRC-paging message is used for UEs in the LC MTC mode to establish RRC connection. In one embodiment, the UE reports the CE status to the network entity, such as MME or NAS when registering to the network. The UE can subsequently update its CE status upon detecting trigger event, such as the changes of CE level. The UE can indicate a new CE level to the network by RACH transmission by different RACH format or RACH resources. Other signaling can also be used to send the CE level information to the network. In one embodiment, the CE status report is a RSRP/RSRQ measurement. And the eNB should determine the CE level of the UE based on the report. In another embodiment, the CE status report is a specific CE status determined at UE side. The specific CE status can be a repetition number or a specific CE level. eNB delivers UE CE level to the network. When to page LC MTC UEs, the network can initiate M-RRC-paging transmission based on UE CE status report. When to report CE status, only a CE status within one cell is reported in one embodiment. In another embodiment, the CE statuses associated with multiple cells are reported.

In one embodiment, a M-RRC-paging is used to initiate RRC connection setup. The UE scheduling list comprising a UE ID is transmitted in the M-RRC-paging. In the first embodiment, the M-RRC-paging is a dedicated UE-specific paging message, and is transmitted to the dedicated UE based on the UE ID, such as the IMSI, and the CE status of the dedicated UE. In a second embodiment for the M-RRC-paging, the M-RRC-paging is a multicast message for a group of UEs in LC MTC mode. The repetition number of the (re)transmission is based on the CE level of the group of UEs. Therefore, for multicast M-RRC-paging for UEs in the LC MTC mode, grouping UEs with the same/similar CE level is necessary. The network detects the CE level for each UE in the LC MTC mode, and groups these UEs with the same CE level together for the multicast M-RRC-paging message. In a third embodiment, the M-RRC-paging is a broadcast message. To ensure the UEs with all possible CE levels can receive the M-RRC-paging, the message is repeated transmitted by a maximum number based on the highest CE level of all UEs in the broadcast group. The determined maximum repetition number has to be allowed by the cell to be broadcasted. If the maximum repetition number according the highest CE level of all UEs is greater than the maximum allowed number of the target cell(s), the M-RRC-paging is transmitted by the maximum allowed repetition number of the destination cell.

In another embodiment for the M-RRC-paging message, the M-RRC-paging is used to initiate the RRC connection setup and to inform the UEs of M-SI message updates. The UE scheduling list is carried within the M-RRC-paging. In one embodiment, a one-bit simplified notification of M-SI message modification is carried in the RRC-paging. For example, if the notification bit is set as true, the UE will further detecting M-SI-paging. The UE, thereby, does not monitor both M-SI-paging and M-RRC-paging all the time. The M-RRC-paging in this embodiment can be a unicast message, a multicast message, or a broadcast message. Similarly, to the above, the repetition number is determined based on the CE level of the UE using the unicast message, the CE level range of the group of UEs in the multicast message, or the maximum allowable repetition number or the maximum required repetition based on the highest CE level of all UEs in the broadcast group.

No matter the CE status report comprises multiple CE status with multiple cells, or only with one cell, M-RRC-paging can be transmitted within multiple cells considering UE mobility.

In yet another novel aspect, modified transmission mechanisms for M-Paging are used for UEs in the LC MTC mode. In one embodiment, control-less paging transmission is used. In one embodiment, signal format of M-paging can be a sequence, generated from M-P2-RNTI, with a fixed sequence length. Alternatively, the signal format of the M-paging can be an encoded data packet scrambled with M-P2-RNTI. The encoded data packet uses a predefined mapping relationship between the M-paging TBS and the resource size, or the mapping is created with a predefined resource size with a fixed M-paging TBS. In another embodiment, the physical resource location at the frequency domain can be fixed or redefined based on the UE ID. A common region can be fixed for M-paging. One or more possible TBS size can be fixed. The UE performs blind detection within the one or more predefined TBSs.

In another embodiment for M-paging transmission, the M-paging is scheduled by a M-PDCCH. The signal format is an encoded data packet. One or more new RNTIs should be allocated. The scheduling M-PDCCH can be common for all or multiple UEs within a cell, or UE-specific for one UE within a cell.

UEs in the LC MTC mode require repeatedly transmission of data block to ensure communication performance. Legacy paging is broadcasted within a tracking area to multiple cells to page UEs for RRC connection. Due the repeatedly transmission for the LC MTC UEs, the traditional paging procedure causes large overhead to the network. To reduce network overhead, new M-paging scheduling is used.

In one novel aspect, UE reports its CE status associated within one cell to the network such that the network knows the CE status of UEs to modify its paging scheduling. In another novel aspect, UE reports its CE status associated with multiple cells to the network.

Figure 9:
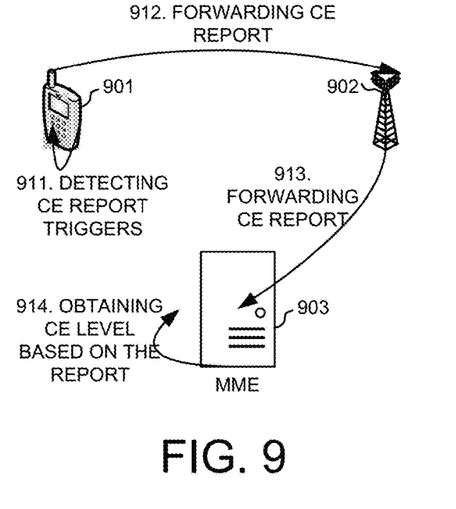
FIG. 9 illustrates an exemplary diagram of UE reporting CE status to the base station after determining a CE level based on measurement, and the base station forwards this report to the network.

FIG. 9 illustrates an exemplary diagram of UE reporting CE status to the network and the network entity determines the CE level of the UE based on the status report. A UE 901 resides within a cell by a base station 902. Base station 902 connects with a network entity 903, such as an MME. At step 911, UE 902 detects trigger events for CE status report. In one embodiment, the CE trigger event can the change of the CE level detected, based on some measurement like RSRP/RSRQ. In another embodiment, the trigger event can be connection changes, such as handover or first connection, of UE 901. The trigger event can be a periodic timer as well. In yet another embodiment, the trigger event can be receiving an inquiry of UE status or UE CE status from other network entities. Upon detecting the triggering event, at step 911, UE 901 determines a CE status, and forwards the CE status report to base station 902 in step 912. In one embodiment, the CE status report may include one or more information, such as a specific CE level of UE 901, a repetition number based on detected CE level. The CE status report may include the cell ID, the cell group ID if a CE status associated with multiple cells wherein these cells may be within different cell group, and/or the UE ID. At step 913, base station 902 forwards the received UE CE status report to MME 903. At step 914, MME 903 obtains the CE level for UE 901 based on the UE CE status report received.

Figure 10:
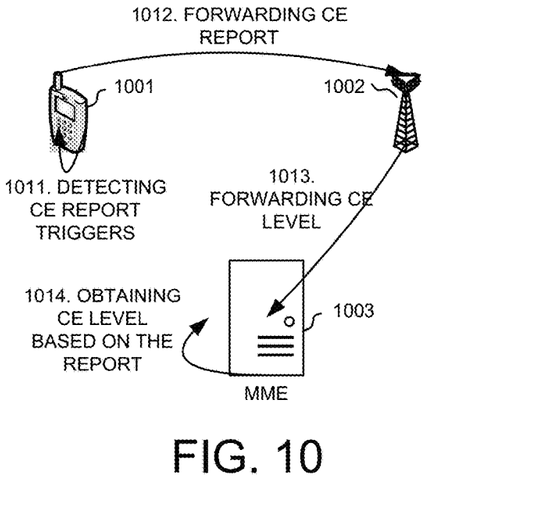
FIG. 10 illustrates an exemplary diagram of UE reporting CE status to the base station and the base station determines the CE level based on the status report and forwards the determined CE level to the network.

FIG. 10 illustrates an exemplary diagram of UE reporting CE status to the network and the base station determines the CE level based on the status report and forward the determined CE level to the network. A UE 1001 resides within a cell by a base station 1002. Base station 1002 connects with a network entity 1003, such as an MME. At step 1011, UE 1002 detects trigger events for CE status report. At step 1012, UE 1002 forwards the UE CE status to base station 1002. Base station 1002, upon receiving the UE CE status report, the base station determines the CE level of the UE based on the received UE CE status report. Base station 1002 forwards the determined CE level information to MME 1003 at step 1013. MME 1003 upon receiving the modified CE status report from base station 1002, decodes the message and obtains the CE level for UE 1001 based on the received report.

Figure 11:
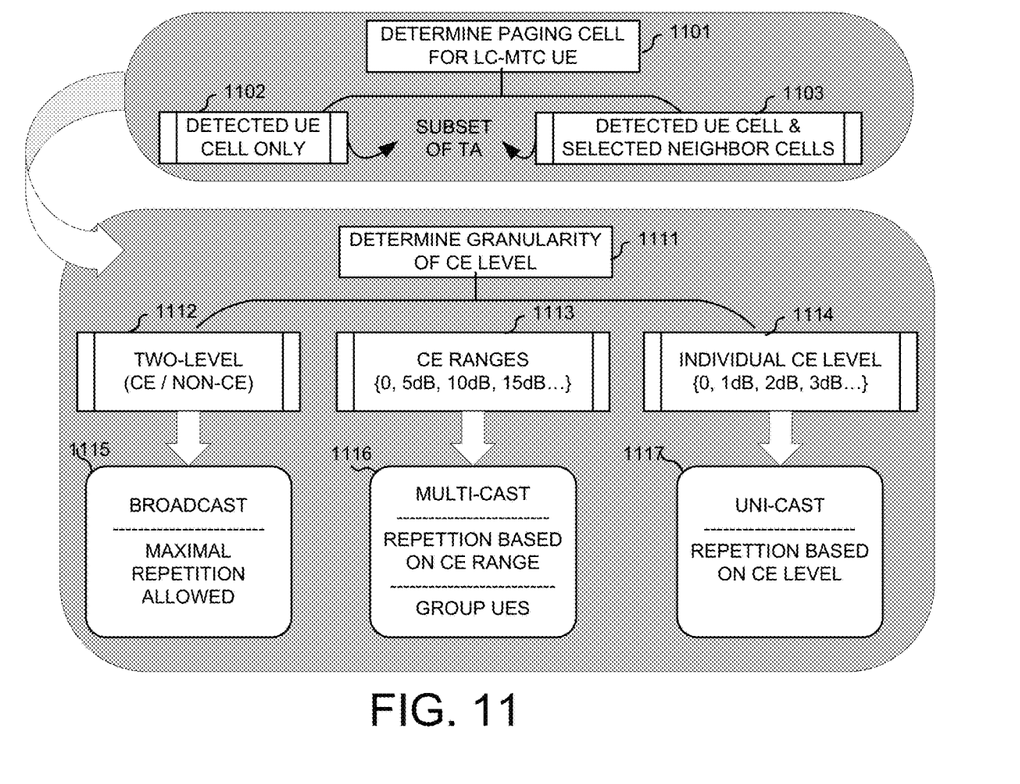
FIG. 11 illustrates exemplary diagrams for M-paging scheduling with different transmission schemes in accordance with embodiments of the current invention.

FIG. 11 illustrates exemplary diagrams for M-paging scheduling with different transmission scheme in accordance with embodiments of the current invention. In one novel aspect, the M-paging is not sent to the whole tracking area but to a subset of the cells in the tracking area. The network entity, such as the MME, keeps track of the cell ID or the cell group ID of the UE in the LC MTC mode. At step 1101, the network entity determines one or more target cells for the UE in the LC MTC mode to send the M-paging. In one embodiment, as shown in step 1102, the network entity selects only the detected cell where the UE resides. In another embodiment, as shown in step 1103, the network entity selects additional neighboring cells based on a CE status report. The selected one or more target cells is a subset of the tracking area for the UE. The signaling overhead is reduced by only send the M-paging to a subset of tracking area cells. In one embodiment, the network sends M-paging to additional neighboring cells of the cell that the UE resides as target cells. Upon receiving the M-paging, the base station checks if the paged UE is recorded within the base station. In one embodiment, if the base station does not have the record for the UE, the base station will not send the M-paging message to page this UE.

In another novel aspect, different CE granularities or different triggering event are defined for CE status report. At step 1111, the CE granularity of the CE level for the UE in the LC MTC mode is determined. In one embodiment as shown in step 1112, only two CE levels are defined, CE and non-CE, which means UE with CE and UE without CE. Accordingly, only when CE status changes from CE to non-CE or from non-CE to CE, the UE will report CE status. Then, at step 1115, the network entity broadcast the M-paging by a maximal number. The maximal repetition number is determined based on the highest CE level and the maximum repetition allowed for each cell. In another embodiment, as shown in step 1113, several CE levels are specified. For example, the CE level is grouped as {0 dB, 5 dB, 10 dB, 15 dB}. If a CE requirement is less than 10 dB and larger than 5 dB, the CE level of one UE is 5 dB. Accordingly, at step 1116, the network entity determines to use multicast for the M-paging. The repetition number is determined based on the CE level for the group of UEs. UEs with the same CE level ranges are group together for M-paging. In a third embodiment, as shown in step 1114, a smaller granularity of the CE level is defined. For example, the CE level for the UE is selected from {0 dB, 1 dB, 2 dB ... }. Accordingly, at step 1117, the network entity determines to use unicast for the M-paging. The repetition number is determined based on the CE level for the UE.

Figure 12:
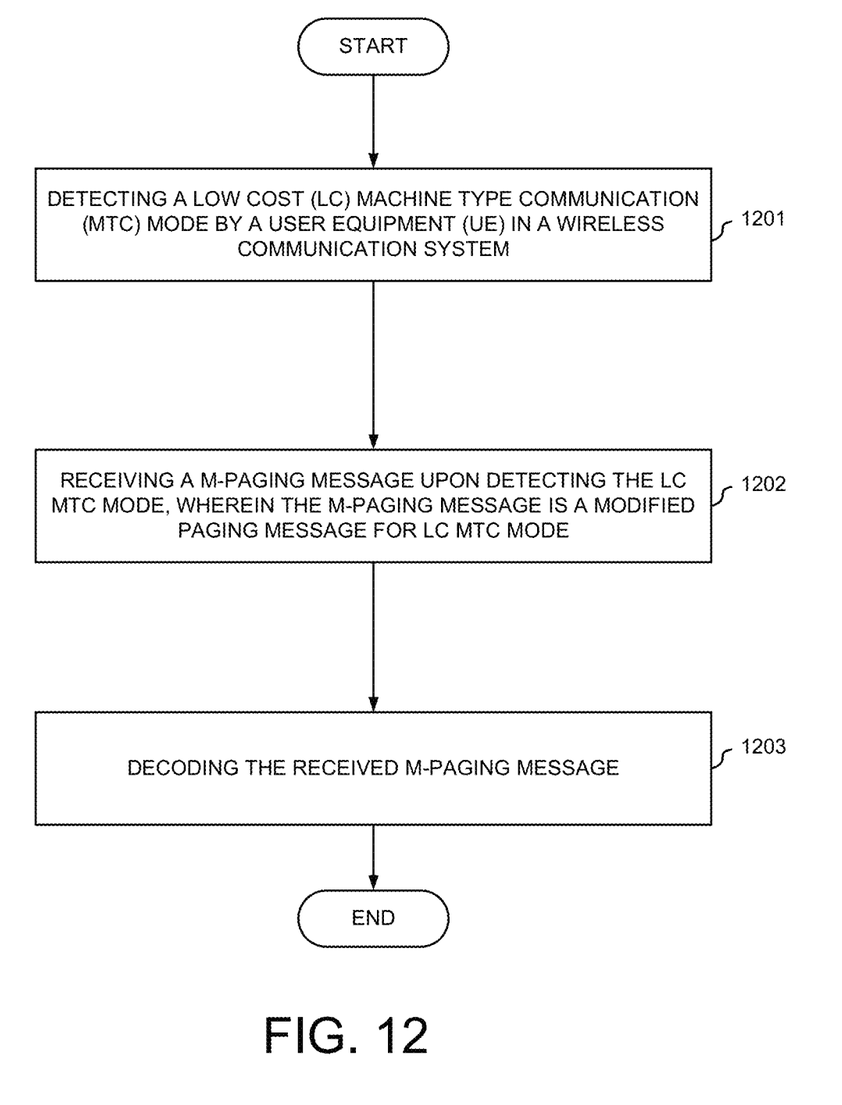
FIG. 12 is an exemplary flow chart of a LC MTC UE handling M-paging in accordance with embodiments of the current invention.

FIG. 12 is an exemplary flow chart of a LC MTC UE handling modified paging in accordance with embodiments of the current invention. At step 1201, the UE detects a LC MTC mode in a wireless communication system. At step 1202, the UE receives an M-paging message upon detecting the LC MTC mode, wherein the M-paging message is a modified paging message for LC MTC mode, for example to initiate RRC connection setup. At step 1203, the UE decodes the received M-paging message.

Figure 13:
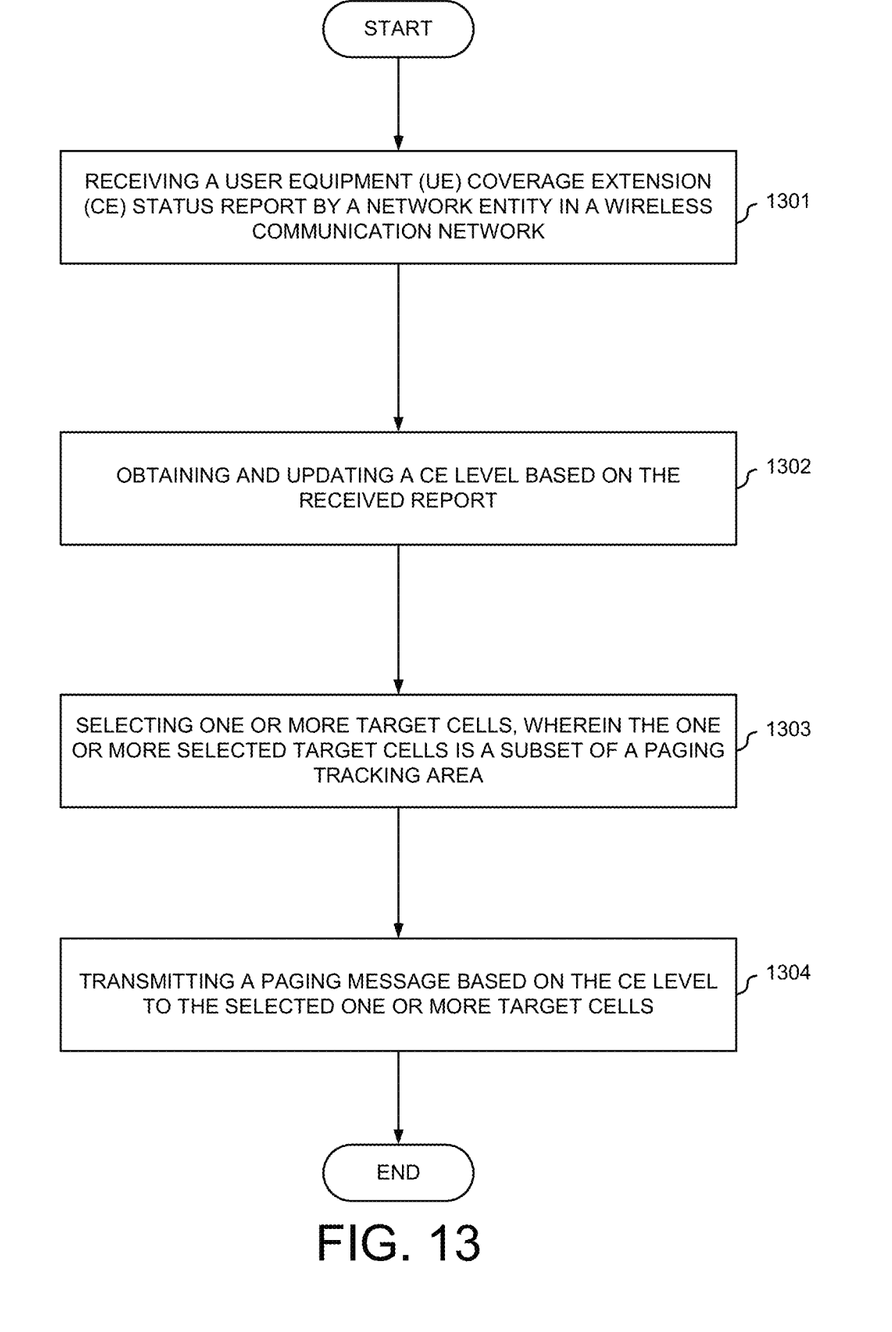
FIG. 13 is an exemplary flow chart of a network entity handling M-paging schedule for UEs in the LC MTC mode in accordance with embodiments of the current invention.

FIG. 13 is an exemplary flow chart of a network entity handling modified paging schedule for UEs in the LC MTC mode in accordance with embodiments of the current invention. At step 1301, the network entity receiving a user UE coverage extension (CE) status report in a wireless network. At step 1302, the network entity obtains and updates a UE CE level based on the received report. At step 1303, the network entity selects one or more target cells, wherein the one or more selected target cells are a subset of a paging tracking area. At step 1304, the network entity transmits a M-paging message based on the CE level to the selected one or more target cells.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
   detecting a low cost (LC) mode by a user equipment (UE) in a wireless communication system, wherein the LC mode has reduced bandwidth;
   determining time-frequency resources to receive a M-paging message upon detecting the LC mode, wherein the M-paging message is a modified paging message transmitted on a control channel and indicates one or more modified system information (SI) fields, which are transmitted repeated by a repetition number greater than one;
   buffering the M-paging message when the M-paging message carries a variable size SI-update bitmap or when the M-paging message is generated from specific paging radio network temporary identifier for LC (M-P1-RNTI) sequences with dynamic mapping between the M-P1-RNTI and update SI fields;
   decoding the received M-paging message; and
   determining one or more updated SI updates.

2. The method of claim 1, wherein the UE is in LC mode upon detecting one or more condition comprising: the UE is a LC device, and the UE is in a coverage extension (CE) mode.

3. The method of claim 1, wherein the M-paging message carries a bitmap to indicate the one or more updated SI messages.

4. The method of claim 3, wherein the size of the bitmap is a maximum fix length.

5. The method of claim 3, wherein the size of the bitmap is of variable length.

6. The method of claim 5, wherein the M-paging message includes only the modified SI fields.

7. The method of claim 1, wherein the M-paging message is generated from specific M-P1-RNTI sequences to indicate the one or more updated SI messages, wherein the M-P1-RNTI is a modified P-RNTI sequence.

8. The method of claim 7, wherein the mapping between the M-P1-RNTI and the subset of the updated SI messages is statically predefined.

9. The method of claim 7, wherein the mapping between the M-P1-RNTI and the subset of the updated SI messages dynamically configured by the wireless network.

10. The method of claim 1, wherein the M-paging message is a modified RRC paging message, and wherein a repetition number for the repeatedly transmitted modified RRC paging message is determined at least based on the transmission mode selecting from a UE-specific paging message, a multi-cast message, and a broadcast message.

11. A user equipment (UE) comprising
    a transceiver that transmits and receives radio signals via a first radio access link;
    a low cost (LC) detecting circuit that detects a LC mode of the UE; and
    a M-paging circuit that determines frequency-time resources to receive a M-paging message upon detecting the LC mode, wherein the M-paging message is a modified paging message transmitted on a control channel and indicates one or more modified system information (SI) fields, which are transmitted repeated by a repetition number greater than one, and buffers the M-paging message when the M-paging message carries a variable size SI-update bitmap or when the M-paging message is generated from specific paging radio network temporary identifier for LC (M-P1-RNTI) sequences with dynamic mapping between the M-P1-RNTI and update SI fields.

12. The UE of claim 11, wherein the M-paging message is a modified SI paging message, and wherein the M-paging message carries a bitmap to indicate the one or more updated SI messages.

13. The UE of claim 11, wherein the M-paging message is a modified SI paging message, and wherein the M-paging message is generated from specific M-P1-RNTI sequences to indicate the one or more updated SI messages, wherein the M-P1-RNTI is a modified P-RNTI sequence.

14. The UE of claim 11, wherein the M-paging message is a modified RRC paging message, and wherein a repetition number for the repeatedly transmitted modified RRC paging message is determined at least based on the transmission mode selecting from a UE-specific paging message, a multicast message, and a broadcast message.

15. The UE of claim 11, wherein the size of the bitmap is of variable length and the M-paging message includes only the modified SI fields.

* * * * *